United States Patent [19]

Beckman

[11] Patent Number: 5,105,183
[45] Date of Patent: Apr. 14, 1992

[54] SYSTEM FOR DISPLAYING VIDEO FROM A PLURALITY OF SOURCES ON A DISPLAY

[75] Inventor: Kenneth O. Beckman, La Honda, Calif.

[73] Assignee: Digital Equipment Corportion, Maynard, Mass.

[21] Appl. No.: 344,617

[22] Filed: Apr. 27, 1989

[51] Int. Cl.[5] .............................................. G09G 5/14
[52] U.S. Cl. ..................................................... 340/717
[58] Field of Search ................. 340/717, 721; 358/181, 358/108, 231, 236

[56] References Cited

U.S. PATENT DOCUMENTS 3,961,324  6/1976  Cousin et al. ....................... 340/717
4,791,417  12/1988  Bobak .................................. 340/793
4,814,869  3/1989  Oliver, Jr. ........................... 358/108

FOREIGN PATENT DOCUMENTS 2148077  5/1985  United Kingdom ................ 340/717

Primary Examiner—Jeffery A. Brier
Attorney, Agent, or Firm—Flehr, Hohbach, Test, Albritton & Herbert

[57] ABSTRACT

A video image monitoring system for simultaneously monitoring a plurality of video images associated with a plurality of concurrent video signals. The system includes a solid state display panel, such as a LCD, having a number of directly addressable subpanels, each of which is used to display a selected video image. A distributor couples each of the video signals to one of the subpanels. The distributor is programmably controlled by a controller. For video signals which are modulated onto carrier signals, demodulators are provided which have programmable selection ability.

10 Claims, 4 Drawing Sheets

SYSTEM FOR DISPLAYING VIDEO FROM A PLURALITY OF SOURCES ON A DISPLAY

BACKGROUND OF THE INVENTION

Field Of The Invention

This invention relates to video monitors, and more particularly, to systems for simultaneously monitoring a plurality of video signals.

Prior Art

Simultaneous observation of a number of concurrent video signals from a number of video channels is not easily accomplished. These video signals are provided by a number of sources such as broadcast channels, narrowcast channels, cablecast channels, groups of directly routed video-modulated signals, or groups of directly routed video signals.

A single monitor is used to sequentially display video information from some or all of the source channels or signals by sequential selection.

For simultaneous viewing of video information from a plurality number of source channel or signals, a number of CRT monitors are arranged as an array of video monitors to simultaneously display in real time the video information. This approach consumes a great deal of power and space.

Another technique converts the video signals to a digitized format and stores the digitized video information from each video channel in a video frame buffer, which is a large-capacity, high speed memory device. Digitized video information is read into this memory device and subsequently read out at the pixel rate of a viewing device to display the video information on, for example, one of a plurality of smaller viewing panels on a raster-scanned CRT display device. This technique requires a great amount of high-speed memory storage capacity to store digitized information for all of the channels to be displayed because information from each signal must be captured and stored in the frame buffer.

It is desirable to simultaneously display and monitor a number of video signals without sequentially selecting each source for display or without dedicating a monitor device to each source.

SUMMARY OF THE INVENTION

It is an object of the invention to provide a device for simultaneous monitoring signals from a number of video sources on a solid state monitor.

It is another object of the invention to provide a monitoring system which is readily adapted to receive video information in a variety of formats.

It is another object of the invention to provide a video monitoring system which occupies a small space and consumes a great deal less power than a CRT-based system using a number of CRT monitors.

It is another object of the invention to provide a monitoring system which provides for selection of audio information associated with input video signals.

In accordance with this and other objects of the invention, a system is provided for simultaneously monitoring in real time each of a plurality of input video signals. The system includes a display panel, such as a solid state LCD, which in a specific embodiment of the invention has a number of directly addressable subpanels for displaying in real time selected video images. The invention also includes distribution means for selectably coupling certain video signals to the display subpanels. The invention also includes a means for controlling the distribution means so that predetermined video signals are coupled to the display.

The video signals are received, for example, as baseband video signals, as video-modulated FM carrier signals, as RGB signals, or as other unencoded video sources. Demodulators are provided which are each associated with a display subpanel and which include means for programmably selecting which of the carrier signals is to be demodulated for presentation on a particular subpanel. Means are provided for indicating and presenting audio information associated with a particular video signal.

The distribution means includes a programmable routing switcher. For operation with, for example, multiple video data terminals of a multi-user computer system, the video data signals are converted to video signals using an encoder.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
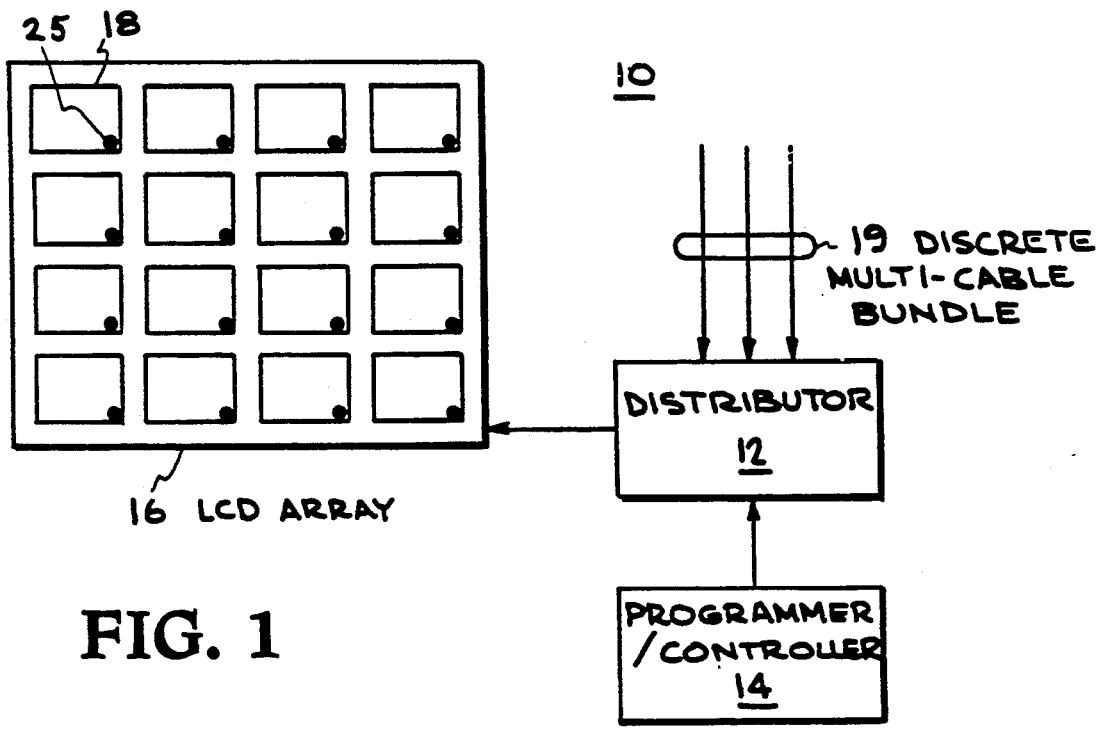
FIG. 1 is a block diagram of a video image monitoring system having a multi-cable bundle of input signal lines feeding into a programmer/controller for a solid state array.

FIG. 1 shows a video image monitoring system 10 which permits an observer to simultaneously monitor in real time a number of concurrent, real-time video images from separate video sources. The video signals may be synchronous or non-synchronous This system does not require using a number of separate CRT monitors to monitor each signal. Nor does this system require using a single CRT monitor to alternately view each video image in a serial sequence.

The video signals are intended to have a number of video display features including monochrome, color, and stereoscopic presentations. The signals are displayed concurrently without the necessity for frame-storage memories. The signals may also be either synchronous or asynchronous concurrent signals. The invention is also not limited to video displays having either high or low resolution, but is intended to cover systems having any resolution.

The video image monitoring system 10 includes a video signal distributor 12, a programmer/controller 14, and a solid state display panel 16, having a array of a number of subpanels (typically indicated as 18). The video distributor 12 selectively couples the input video signals to selected subpanels 18 of the display 16. The distributor functions as a router for connecting input video signals to selected display panels. The programmer/controller 14 controls the distributor to provide the desired connections. For consumer applications, the programmer may include manually-operated means for selecting which video signal is displayed on a particular display subpanel. For other applications, the programmer alternatively may include computed-controlled means for selecting video signals to be displayed on particular display subpanels. The subpanels 18 are arranged as shown in a two-dimensional array on the panel 16. Solid state display panels are available, including liquid crystal displays (LCDs), which have certain areas, or subpanels, which are independently addressed and controlled. Video images from a number of separate video signal sources are therefore able to be displayed without the need for using a number of CRT displays, one for each image to be viewed or for large frame storage memories, one for each image to be displayed It is intended that this invention also cover systems in which the total number of input signals exceeds the number of display panels.

Applications for the image monitoring system according to the invention are numerous, that is, any application where a number of video images are to be viewed in realtime on a compact video display, such as on a LCD display. A number of video signals are made available through a bundle 19 of discrete cables, one for each video signal. The video signals may be received as either baseband video signals or as carrier signals modulated by video signals. These signals may also originate in any of a number of different types of sources. For example, the modulated carrier signals may be from broadcast channels, closed-circuit narrowcast channels, cablecast channels, and the like. The video signals may also be R, G, B signals or other unencoded video signals The sources of such video signals include, but are not limited to, cameras, signal generation equipment, etc. Both the baseboard video signals and the modulated carrier signals are obtained from activities which produce a number of video images to be monitored at a central location by an observer.

Business and commercial applications of the invention include: monitoring of multiple computer terminals linked to a multi-user computer system; observation of automated factory assembly lines, monitoring of multi-camera security systems, monitoring of robot-vision equipment in manufacturing or warehousing facilities; monitoring and troubleshooting of the traffic on a routing switcher within a television station or within a video post-production facility. Consumer applications of the invention include a system for monitoring and selecting a desired program from a number of programs currently being broadcast or cablecast. The video image monitoring system 10 according to the invention is particularly useful with these applications as well any other application where a number of images from separate video signals are to be simultaneously monitored.

Figure 2:
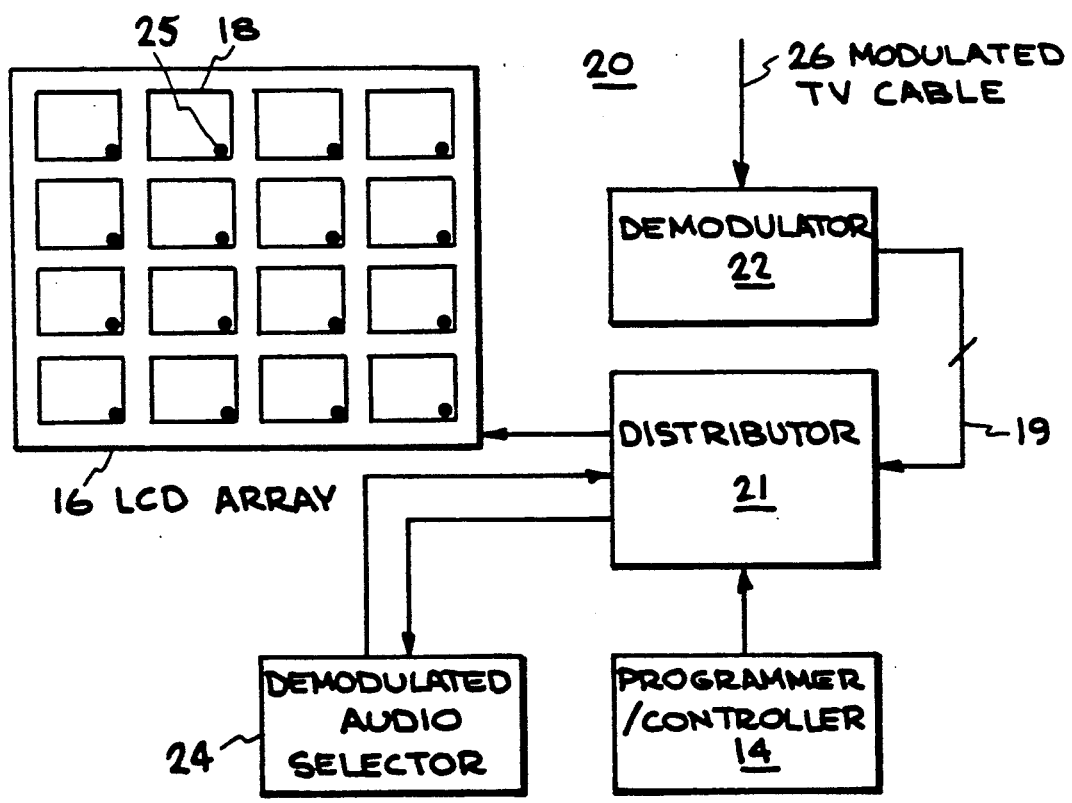
FIG. 2 is a block diagram of a video image monitoring system similar to that shown in FIG. 1 and further including demodulators for video and audio signals

FIG. 2 shows a video image monitoring system 20 which is the same as the system shown in FIG. 1 with the addition of a video multi-demodulator module 22 and an audio selector/demodulator module 24. The video demodulator module 22 receives a number of video-modulated carrier signals on a single input cable 26. A number of conventional tuned receivers within the demodulator module 22 each select and demodulate a particular video signal These video signals are then coupled to the distributor 21 via the cable bundle 19.

The audio selector/demodulator module 24 permits an operator to select an audio channel to be monitored. The modules includes means for selection and demodulation of the audio signal from the audio subcarrier associated with a particular video signal. Each of the display subpanels 18 includes a visual indicator, typically shown as 26, such as a light-emitting diode LED or the like, for visually indicating that a particular audio signal has been selected and is being monitored.

Figure 3:
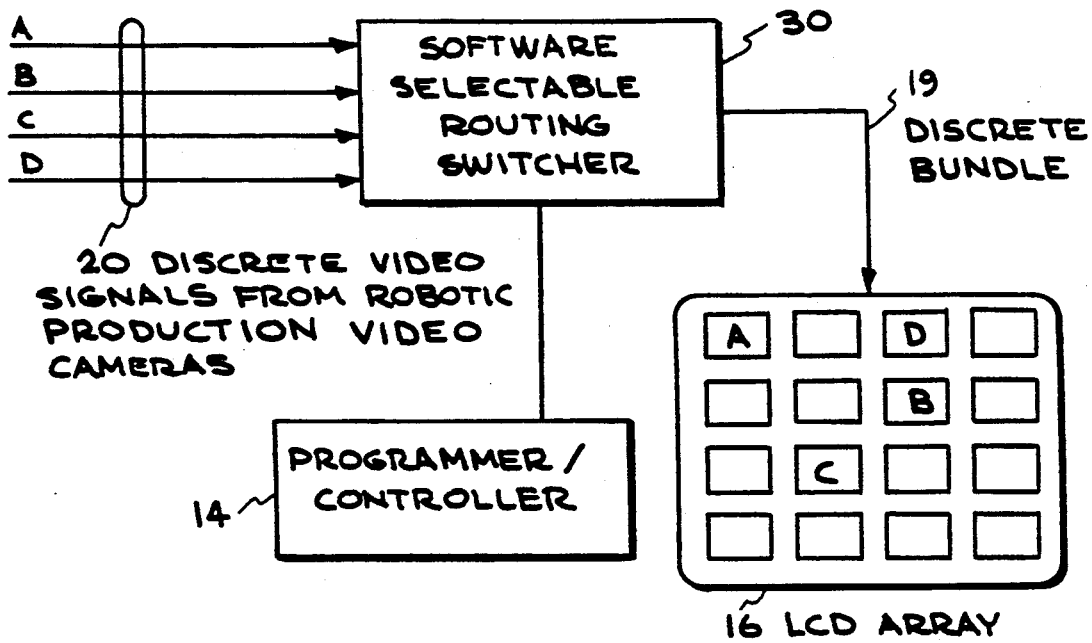
FIG. 3 is a block diagram of a video image monitoring system applied to a production supervision system.

FIG. 3 shows an application of the video image monitoring system according to the invention for use in a manufacturing environment. In an electronics production facility in which surface-mounted integrated circuits are assembled with other components, video signals from microscope images are routinely used for observation and for performance of quality-control procedures during various process steps, such as bonding, reflow soldering, and the like. The ability to observe images from a number of locations in large manufacturing facility is very desirable, particularly for supervisory or managerial personnel in such a facility. The invention provides this capability with minimum space requirements.

In this application, a number of discrete video signals are received from, for example, robotic-production video cameras on the individual cables within the cable bundle 190. The signals are received either from video distribution amplifiers or from the video loop-through output terminals of a local monitor at a work station. The routing switcher 30 is, for example, a commercially available, electronically programmable routing switcher, provided by the Grass Valley Group. This routing switcher permits an operator to select under software control which of all the input video signals are to be assigned to the various subpanels 18 on the video display panel 16. The total number of input video signals typically may exceed the total number of subpanels available so that periodic switching of video signals is required. Audio signals are not usually associated with these types of video signals so that the audio monitoring feature of the invention is not used.

Figure 4:
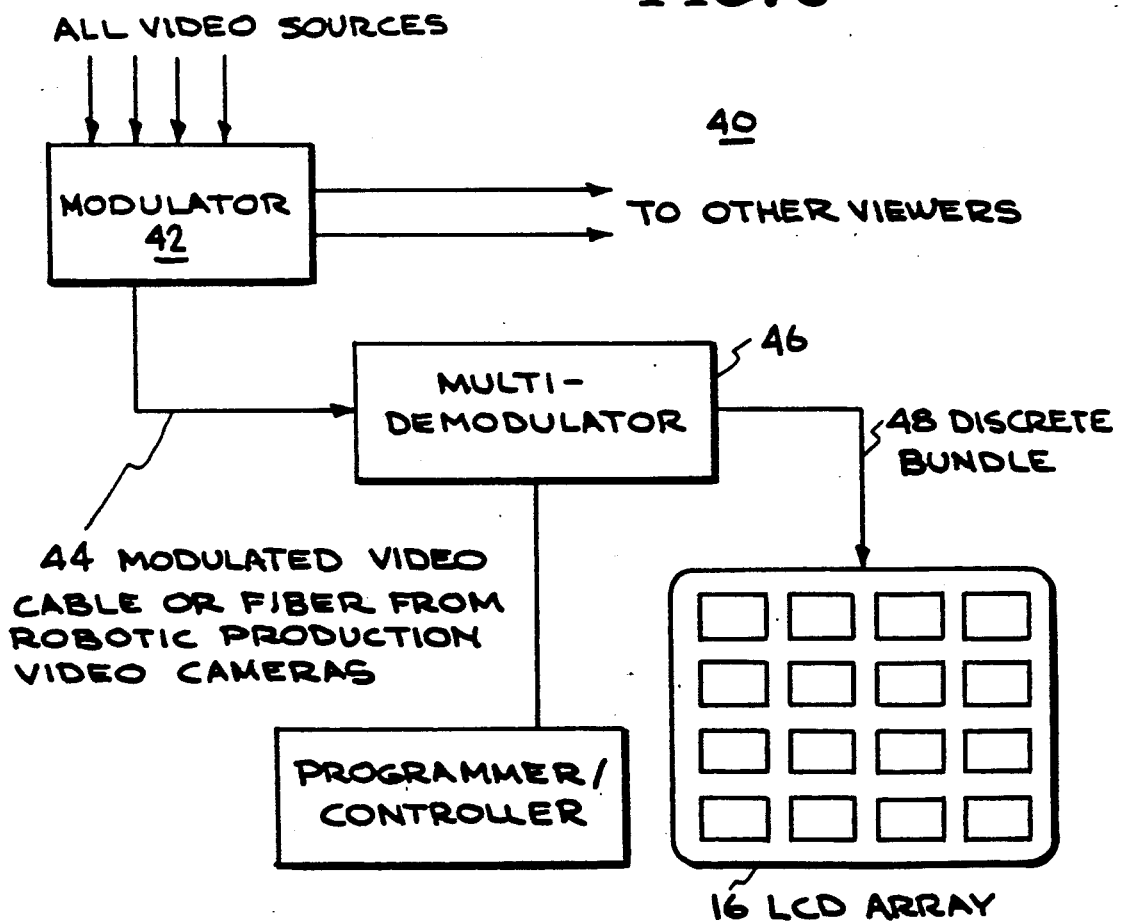
FIG. 4 is a system similar to that shown in FIG. 4 in which the video signal is modulated onto a carrier signal.

FIG. 4 shows another system 40 which is an application of the video image monitoring system according to the invention. For a large number of video sources located at a great distance from the monitoring station, it is desirable to modulate the video signals onto carrier signals which are then combined on a single electronic or fiber-optic cable for transmission tot he monitoring station. A conventional modulator subsystem 42 receives a number of video signals which are modulated onto carrier signals. A cable 44, which is either an electronic cable or a fiber-optic cable, connects the modulator output signals to a multi-channel demodulator subsystem 46. The demodulator 46 includes a number of video demodulation circuits, each of which is controlled by a digital controller such as, for example, the Zilog Z86C27 Digital Television Controller. The output of each of the demodulation circuits is coupled to one of the subpanels of the display 16 on one of a number of cables contained in a cable bundle 48. Selection of the video signal to be displayed on each subpanel is accomplished by programming of the controller associated with that subpanel.

Figure 5:
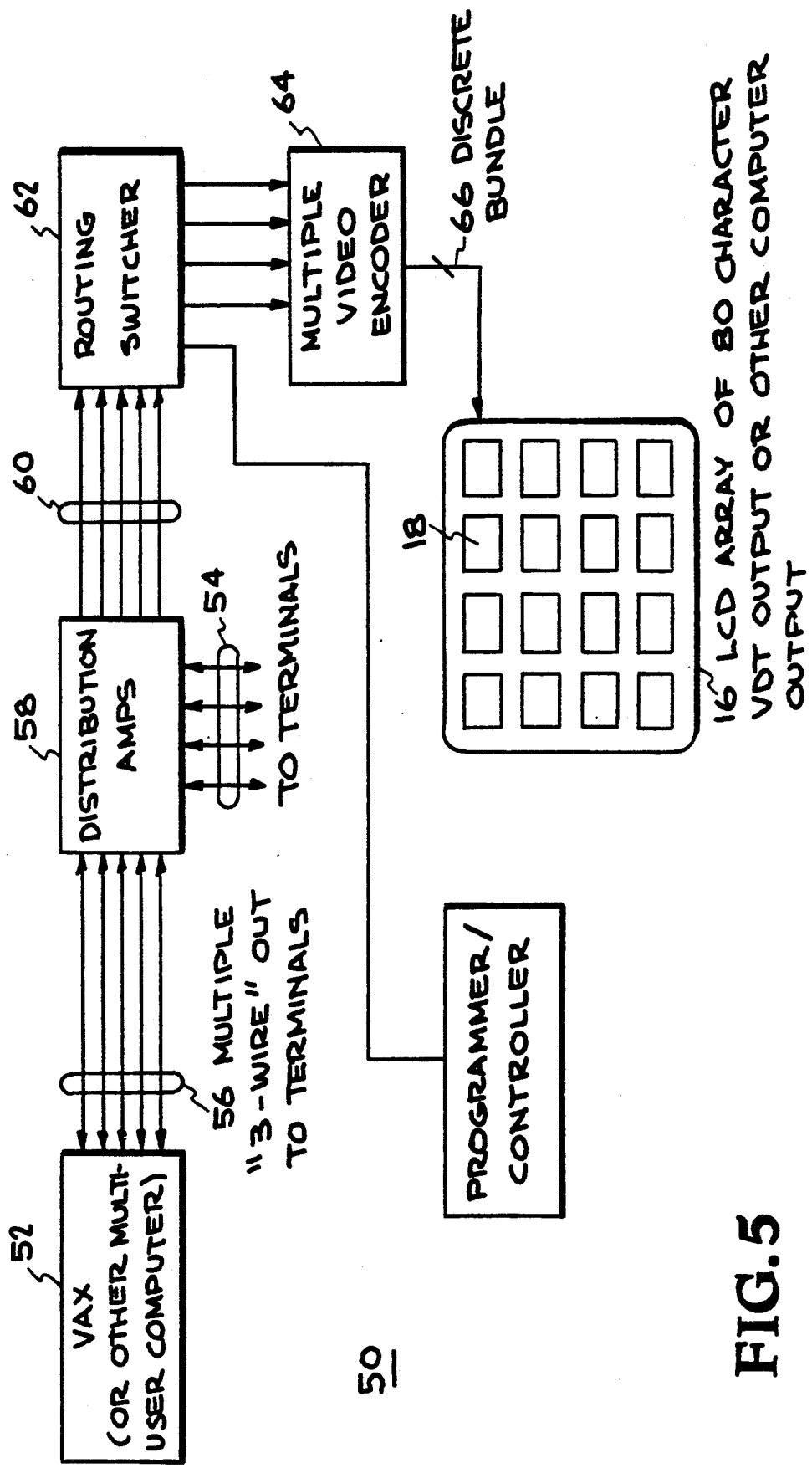
FIG. 5 is a block diagram of a computer system application of a video image monitoring system according to the invention.

FIG. 5 shows another system 50 which provides an alphanumeric character display monitoring system according to the invention. This system is used with multiple character display terminals (not shown) which communicate with a multi-user computer system 52 on cables 54,56. A minimal set of signal lines for each terminal uses a 3-wire configuration, two wires for transmission and reception of ASCII-character signals and the wire for a ground connection. Additional lines for various control functions are used, as required. The character display terminals may be either intelligent terminals with local computing capabilities for emulating a data terminal or simple data terminals, as desired. A multi-channel distribution amplifier module 58 has output terminals which provide the data transmission signals corresponding to the video signals transmitted to the terminus from the multi-user computer. These data signals are coupled using a cable bundle 60 to a routing switcher 62 which routes the signals to dedicated encoder circuits in a video encoder module 64. The output terminal of each encoder circuit is connected to one of the subpanels 18 of the display 16 through a cable bundle 66. The routing switcher 62 is programmably controlled to select which video signal is displayed on a particular display subpanel 18. Using this system, an observer or supervisor is able to monitor the information being displayed on a number of the video display terminals which are linked to a multi-user computer system.

Figure 6:
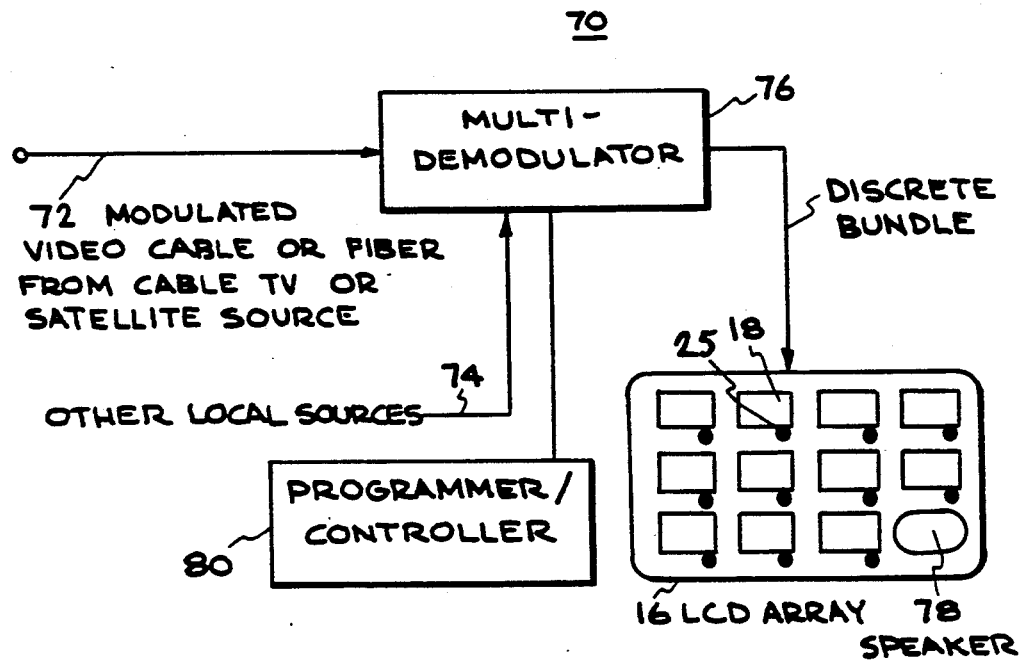
FIG. 6 is a block diagram of a video image monitoring system applied to a system in which a user selects an audio signal associated with one of the video signals.

FIG. 6 shows a system 70 which is a consumer oriented application of the video monitoring system according to the invention This system permits a viewer of broadcast, cablecast, or satellite video programs to simultaneously observe programs received on an arbitrarily large number of video sub panel channels. This system is similar to the system shown in FIG. 4. Video-modulated signals are received on a cable 72, which is either an electronic or a fiber-optic cable, from a cablecast or satellite source. Signals from other local broadcast signal sources may also be received on a cable 74. Both cables provide input signals to a multi-channel demodulator 76 of the type described in connection with FIG. 4, The video output signals of the individual demodulation circuits of the multi-channel demodulator 76 are each associated with one of the subpanel displays 18. A number of visual indicators 25, as described in connection with FIG. 2 are provided on the front bezel of the display. A speaker 78 is also provided on the display panel 16. When a particular audio channel has been selected, the sound information corresponding to the selected signal is coupled to the speaker 78 and the corresponding LED indicator 25 is illuminated. In this application, selection of the program information to be displayed on a particular subpanel display 18 is accomplished using a programmer/controller which is, for example, a touch-screen system or a wireless remote control device commonly used for channel selection and adjustment of consumer television, video recording, and audio equipment. Selection of the audio channel to be monitored is also controlled with such a controller/programmer. Selection of one of the video images to be displayed on a larger main viewing device such as a largescreen projection TV, large CRT display, or the like is also accomplished with such a controller/programmer, where the control functions may be implemented by various combinations of control key depressions on such a control device.

Note that the invention provides for real-time, full motion video displays without the use of frame-buffer memories or a number of separate CRT displays.

Figure 7:
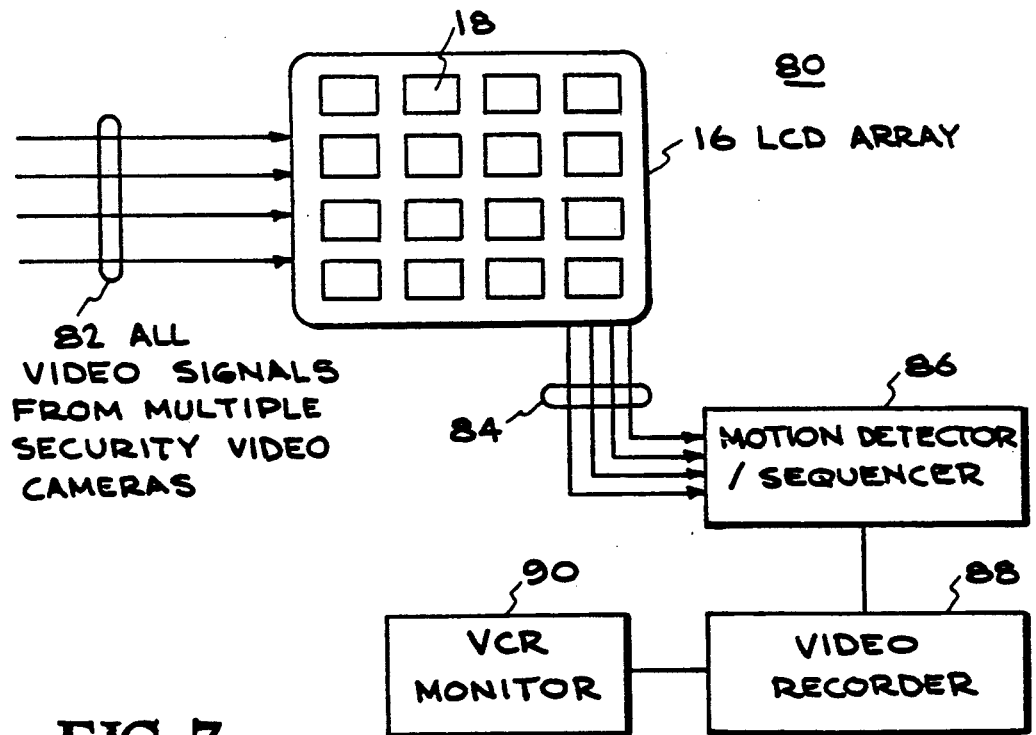
FIG. 7 is a block diagram of a solid state array used in connection with a video image monitoring system according to the invention with a motion detector/sequencer added.

FIG. 7 is a diagram of a system 80 which replaces a typical "wall of monitors" used, for example, in an industrial television security system. Images from the selected input video signals from a number of remotely located video cameras are received on the input cables 82 and displayed, as described hereinabove, on the subpanels 18. These signals are also fed on the cables 84 to conventional equipment commonly used with such security systems, such as a motion detector/sequencer having a video recorder 88 and VCR monitor 90 associated therewith. An advantage of such a system is that all of the video sources can be simultaneously monitored within a small space.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A video image monitoring system for real-time, simultaneous monitoring of a plurality of video images associated with a plurality of concurrent video signals, comprising:

a single display having a plurality of directly addressable subpanels within said single display, each capable of receiving a separate image for simultaneously displaying in real time those video images corresponding to selected ones of said plurality of video signals, said single display being composed of a matrix of subpanels where each subpanel is directly adjacent to another subpanel except at an edge of said single display;

distribution means for receiving said video signals and for selectably coupling said video signals to said plurality of directly addressable subpanels within said single display; and control means for controlling the distribution means to couple predetermined ones of said video signals to said plurality of directly addressable subpanels within said single display.

2. The monitoring system of claim 1 wherein said single display is a solid state display having independently controlled and addressable subpanels for display of video images.

3. The monitoring system of claim 1 wherein said video signals are modulated onto carrier signals and wherein said distribution means includes demodulating means for demodulating said video signals from said carrier signals.

4. The monitoring system of claim 3 wherein said demodulating means includes demodulator circuits, each of which provide output demodulated video signals which are coupled to one of the subpanels of said single display, and wherein each of said demodulator circuits includes means for programmably selecting which of said modulated carrier signals are to be demodulated by that particular demodulator circuit.

5. The monitoring system of claim 3 wherein each of said video signals has associated therewith an audio signal and wherein said monitoring system includes means for selecting one of the audio signals, each of said directly addressable subpanels having a selectively actuable visual indicator for showing which audio signal has been selected for hearing and means for audibly presenting said selected audio signal.

6. The monitoring system of claim 1 wherein said distribution means includes a routing switcher means for selectably routing predetermined ones of said video signals to predetermined ones of said plurality of directly addressable subpanels.

7. The monitoring system of claim 6 wherein said control means includes programmable means for controlling said routing switcher means.

8. The monitoring system of claim 2 wherein said distribution means includes:
   receiving means for receiving a plurality of computer video data signals;
   routing switcher means for switching selected ones of said plurality of video data signals to predetermined output channels;
   video encoder means, having a number of input channels coupled to said output channels of said router switcher means, for converting said computer data signals to a signal format suitable for display on said solid state display;
   means for coupling the converted video data signals from said video encoder means to said solid state display.

9. The monitoring system of claim 8 wherein said receiving means receives a plurality of computer data signals associated with a plurality of video display terminals.

10. The monitoring system of claim 1 further including means coupled to the selected video signals displayed on said plurality of directly addressable subpanels of said single display for electronically processing said selected video signals.

* * * * *